(12) United States Patent
Siddaramanna et al.

(10) Patent No.: US 8,523,084 B2
(45) Date of Patent: Sep. 3, 2013

(54) THERMOSTAT WITH UTILITY MESSAGING

(75) Inventors: Lokesh T. Siddaramanna, Karnataka (IN); Harsha N. Chandrashekar, Bangalore (IN); Gary J. Hobart, Glendale, AZ (US); Thomas G. Peterson, Excelsior, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/097,388

(22) Filed: Apr. 29, 2011

(65) Prior Publication Data

US 2011/0199209 A1   Aug. 18, 2011

Related U.S. Application Data

(63) Continuation of application No. 11/770,615, filed on Jun. 28, 2007, now Pat. No. 7,954,726.

(51) Int. Cl.
*B64D 13/00* (2006.01)
*G05D 23/00* (2006.01)

(52) U.S. Cl.
USPC .......................................... 236/91 D; 236/94

(58) Field of Classification Search
USPC ......... 236/46 R, 51, 91 D, 94, 1 C; 340/540; 62/158
See application file for complete search history.

(56) References Cited

U.S. PATENT DOCUMENTS

| | | | |
|---|---|---|---|
| 4,216,384 A | 8/1980 | Hurley | |
| 4,341,345 A | 7/1982 | Hammer et al. | |
| 4,345,162 A | 8/1982 | Hammer et al. | |
| 4,382,544 A | 5/1983 | Stewart | |
| 4,583,182 A | 4/1986 | Breddan | |
| 4,764,766 A | 8/1988 | Aoyama et al. | |
| 5,218,399 A | 6/1993 | Izumi et al. | |
| 5,289,362 A | 2/1994 | Liebl et al. | |
| 5,459,374 A | 10/1995 | Thoeny et al. | |
| 5,482,209 A | 1/1996 | Cochran et al. | |
| 5,539,633 A | 7/1996 | Hildebrand et al. | |
| 5,572,438 A | 11/1996 | Ehlers et al. | |
| 5,578,797 A | 11/1996 | Hewitt et al. | |
| 5,790,977 A | 8/1998 | Ezekiel | |
| 5,884,248 A | 3/1999 | Hall | |

(Continued)

FOREIGN PATENT DOCUMENTS

KR   2006029736 A * 4/2006
WO   8501851   4/1985

(Continued)

OTHER PUBLICATIONS

Honeywell, "Excel Building Supervisor-Integrated R7044 and FS90 Ver. 2.0," Operator Manual, 70 pages, Apr. 1995.

(Continued)

*Primary Examiner* — Chen Wen Jiang
(74) *Attorney, Agent, or Firm* — Seager Tufte & Wickhem LLC

(57) ABSTRACT

The present disclosure pertains generally to thermostats that are adapted to assist utilities in communicating with its customers. In particular, the present disclosure relates to a thermostat having a display, a controller and a receiver that is coupled to the controller. The receiver is adapted to receive messages from a utility, and the controller is adapted to display one or more related display messages on the display.

5 Claims, 17 Drawing Sheets

(56) References Cited

U.S. PATENT DOCUMENTS

| | | | |
|---|---|---|---|
| 5,903,327 A | 5/1999 | Hijii | |
| 5,926,776 A * | 7/1999 | Glorioso et al. | 702/130 |
| 5,956,487 A | 9/1999 | Venkatraman et al. | |
| 5,975,737 A | 11/1999 | Crater et al. | |
| 5,982,362 A | 11/1999 | Crater et al. | |
| 6,061,603 A | 5/2000 | Papadopoulos et al. | |
| 6,067,477 A | 5/2000 | Wewalaarachchi et al. | |
| 6,104,399 A | 8/2000 | Volkel | |
| 6,122,603 A | 9/2000 | Budike, Jr. | |
| 6,139,177 A | 10/2000 | Venkatraman et al. | |
| 6,152,375 A | 11/2000 | Robison | |
| 6,157,943 A | 12/2000 | Meyer | |
| 6,192,282 B1 | 2/2001 | Smith et al. | |
| 6,236,443 B1 | 5/2001 | Carlsen | |
| 6,282,454 B1 | 8/2001 | Papadopoulos et al. | |
| 6,311,105 B1 | 10/2001 | Budike, Jr. | |
| 6,334,107 B1 | 12/2001 | Gale et al. | |
| 6,351,693 B1 | 2/2002 | Monie et al. | |
| 6,353,853 B1 | 3/2002 | Gravlin | |
| 6,405,099 B1 | 6/2002 | Nagai et al. | |
| 6,478,233 B1 | 11/2002 | Shah | |
| 6,484,061 B2 | 11/2002 | Papadopoulos et al. | |
| 6,496,168 B1 | 12/2002 | Tomida | |
| 6,502,758 B2 | 1/2003 | Cottrell | |
| 6,519,509 B1 | 2/2003 | Nierlich et al. | |
| 6,574,581 B1 | 6/2003 | Bohrer et al. | |
| 6,598,056 B1 | 7/2003 | Hull et al. | |
| 6,619,555 B2 | 9/2003 | Rosen | |
| 6,643,567 B2 | 11/2003 | Kolk et al. | |
| 6,671,586 B2 | 12/2003 | Davis et al. | |
| 6,675,193 B1 | 1/2004 | Slavin et al. | |
| 6,681,154 B2 | 1/2004 | Nierlich et al. | |
| 6,721,607 B2 | 4/2004 | Brault | |
| 6,786,421 B2 | 9/2004 | Rosen | |
| 6,789,739 B2 | 9/2004 | Rosen | |
| 6,862,498 B2 | 3/2005 | Davis et al. | |
| 6,904,385 B1 | 6/2005 | Budike, Jr. | |
| 6,917,373 B2 | 7/2005 | Vong et al. | |
| 6,931,445 B2 | 8/2005 | Davis | |
| 6,975,958 B2 | 12/2005 | Bohrer et al. | |
| 6,988,671 B2 | 1/2006 | DeLuca | |
| 7,010,363 B2 | 3/2006 | Donnelly et al. | |
| 7,184,861 B2 | 2/2007 | Petite | |
| 7,279,659 B2 | 10/2007 | Gagas et al. | |
| 7,954,726 B2 * | 6/2011 | Siddaramanna et al. | 236/46 R |
| 8,091,794 B2 * | 1/2012 | Siddaramanna et al. | 236/46 R |
| 2001/0010032 A1 | 7/2001 | Ehlers et al. | |
| 2003/0036822 A1 | 2/2003 | Davis et al. | |
| 2004/0088083 A1 | 5/2004 | Davis et al. | |
| 2004/0133314 A1 * | 7/2004 | Ehlers et al. | 700/276 |
| 2005/0050474 A1 | 3/2005 | Bells et al. | |
| 2005/0194456 A1 | 9/2005 | Tessier et al. | |
| 2006/0049694 A1 | 3/2006 | Kates | |
| 2006/0283964 A1 * | 12/2006 | Garozzo | 236/46 R |
| 2006/0283965 A1 * | 12/2006 | Mueller et al. | 236/51 |
| 2007/0114295 A1 | 5/2007 | Jenkins | |

FOREIGN PATENT DOCUMENTS

| | | |
|---|---|---|
| WO | 9621264 | 7/1996 |
| WO | 9808179 | 2/1998 |
| WO | 03032103 | 4/2003 |
| WO | 2006096854 | 9/2006 |

OTHER PUBLICATIONS

Trane, "System Programming, Tracer Summit Version 14, BMTW-SVP01D-EN," 623 pages, 2002.

http://www.comfortchoice.carrier.com/details_printable, "EMi—Carrier's Internet Communicating Programmable Thermostat," 1 page, printed May 22, 2007.

http://www.comfortchoice.carrier.com/details_printable, "Carrier How Does it Work?", 1 page, printed May 22, 2007.

http://www.comfortchoice.carrier.com/details_printable, "Carrier System Elements and Hardware," 1 page, printed May 22, 2007.

http://www.comverge.com/printer.cfm, "Maingate Home," 1 page, printed May 22, 2007.

http://www.lightstat.com/products/utility.asp, "Lightstat Products for Utility Demand Response and Load Curtailment Programs," 2 pages, printed May 22, 2007.

http://www.smarthome.com/3020t.html, "Aprilaire Communicating Thermostat," 4 pages, printed May 16, 2007.

Carrier ComfortChoice "Verifiable Demand Response, Two-Way Communicating Thermostat," 4 pages, 2007.

Carrier ComfortChoice, Web Interface, User Guide, pp. 1-6, Jan. 2002.

Central and Southwest Communications, Customer Choice and Control Thermostat Touchpad, User Guide, 18 pages, May 1996.

Comverge, Inc., "Adaptive Algorithms Yield Greater Performance," 2 pages, prior to Jun. 28, 2007.

Comverge, Inc., "SuperStat Thermostat Family," 2 pages, prior to Jun. 28, 2007.

Federal Energy Regulatory Commission, "Assessment of Demand Response & Advanced Metering, Staff Report," 228 pages, Aug. 2006.

Honeywell, R4525A Load Relay Module, Installation Instructions, 4 pages, 1995.

Honeywell, Programmable Load Controller Weekday/Weekend (5-day/Saturday/Sunday) Programmable Heat and/or Cool Conventional and Heat Pump T7512A,B,C, User's Guide, 32 pages, 1996.

Honeywell Cannon Technologies Alliance, T7512A,B Programmable Load Management Thermostat, Installation Instructions, 8 pages, 2002.

Honeywell Cannon Technologies Alliance, Programmable Load Management Thermostat Weekday/Weekend (5-day/Saturday/Sunday) T7512A,B, User's Guide, 32 pages, 2002.

Honeywell, T7512A,B,C,D Programmable Load Controller, Installation Instructions, 8 pages, 1997.

Honeywell, T7525/T7526 Thermostat Touchpad, User Guide, 12 pages, 1995.

Honeywell, "TotalHome Energy Management System 2000," 12 pages, 1995.

Honeywell, TotalHome Energy Management System 2000, Specification Data, 2 pages, 1996.

Honeywell, W8525A,B,C,D Control Module, Installation Instructions, 8 pages, 1995.

i-Stat, Installation and Operation Manual, for Low Voltage (24VAC) Systems Only, 14 pages, Nov. 2002.

LightStat, "Model RTPstat Thermostat," 2 pages, prior to Jun. 28, 2007.

Lightstat, "Virtual Gateway," 2 pages, prior to Jun. 28, 2007.

"Energy User News," 4 pages, Mar. 1, 1997.

Andover Controls, "Facility Management Unleashed," 6 pages, 2002.

Andover Controls, "Network News," vol. 2, No. 2, 8 pages, 1997.

Andover Controls, "Andover Controls World," 4 pages, 1997.

Facility Robotics Solutions Direct, "Who We Are and What We Do," 2 pages, Sep. 19, 1997.

Facility Robotics Solutions, "Where Can I go to Find Everything I Need to Put Together LonWorks-Based Automation Systems?," 5 pages, prior to Jun. 28, 2007.

U.S. Appl. No. 60/368,963, 202 pages, filed Mar. 28, 2002.

U.S. Appl. No. 60/383,027, 26 pages, filed May 24, 2002.

* cited by examiner

THERMOSTAT WITH UTILITY MESSAGING

This application is a continuation of co-pending U.S. patent application Ser. No. 11/770,615, filed Jun. 28, 2007, and entitled "THERMOSTAT WITH UTILITY MESSAGING", which is incorporated herein by reference.

TECHNICAL FIELD

The disclosure pertains generally to controllers and more particularly to HVAC controllers such as thermostats that include a display panel.

BACKGROUND

Controllers are used on a wide variety of devices and systems for controlling various functions in homes and/or buildings and their related grounds. Some controllers have schedule programming that modifies device parameters such as set points as a function of date and/or time. Some such device or system controllers that utilize schedule programming for controlling various functions in homes and/or buildings and their related grounds include, for example, HVAC controllers, water heater controllers, water softener controllers, security system controllers, lawn sprinkler controllers, and lighting system controllers.

HVAC controllers, for example, are employed to monitor and, if necessary, control various environmental conditions within a home, office, or other enclosed space. Such devices are useful, for example, in regulating any number of environmental conditions with a particular space including for example, temperature, humidity, venting, air quality, etc. The controller may include a microprocessor that interacts with other components in the system. For example, in many modern thermostats for use in the home, a controller unit equipped with temperature and/or humidity sensing capabilities may be provided to interact with a heater, blower, flue vent, air compressor, humidifier and/or other components, to control the temperature and humidity levels at various locations within the home. A sensor located within the controller unit and/or one or more remote sensors may be employed to sense when the temperature or humidity reaches a certain threshold level, causing the controller unit to send a signal to activate or deactivate one or more component in the system.

The controller may be equipped with a user interface that allows the user to monitor and adjust the environmental conditions at one or more locations within the building. With more modern designs, the interface typically includes a liquid crystal display (LCD) panel inset within a housing that contains the microprocessor as well as other components of the controller. In some designs, the user interface may permit the user to program the controller to activate on a certain schedule determined by the user. For example, the interface may include a separate menu routine that permits the user to change the temperature at one or more times during a particular day. Once the settings for that day have been programmed, the user can then repeat the process to change the settings for the other remaining days. Such a schedule may help reduce energy consumption of the HVAC system by changing the set point to an energy saving set back temperature during certain times.

Most structures are serviced by one or more utilities, such as an electric utility, a gas utility, a water utility and others. The expense of using these utility services continues to rise, particularly during peak demand periods. In order to better serve its customers, and in some cases to help reduce demand during peak or other periods, it would be advantageous for a utility to be able to directly and more efficiently communicate with its customers.

SUMMARY

The present disclosure pertains generally to thermostats that are adapted to assist utilities in communicating with its customers. In particular, the present disclosure relates to a thermostat having a display, a controller and a receiver that is coupled to the controller. The receiver is adapted to receive messages from a utility, and the controller is adapted to display related display messages on the display.

The above summary is not intended to describe each disclosed embodiment or every implementation of the present invention. The Figures and Detailed Description that follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
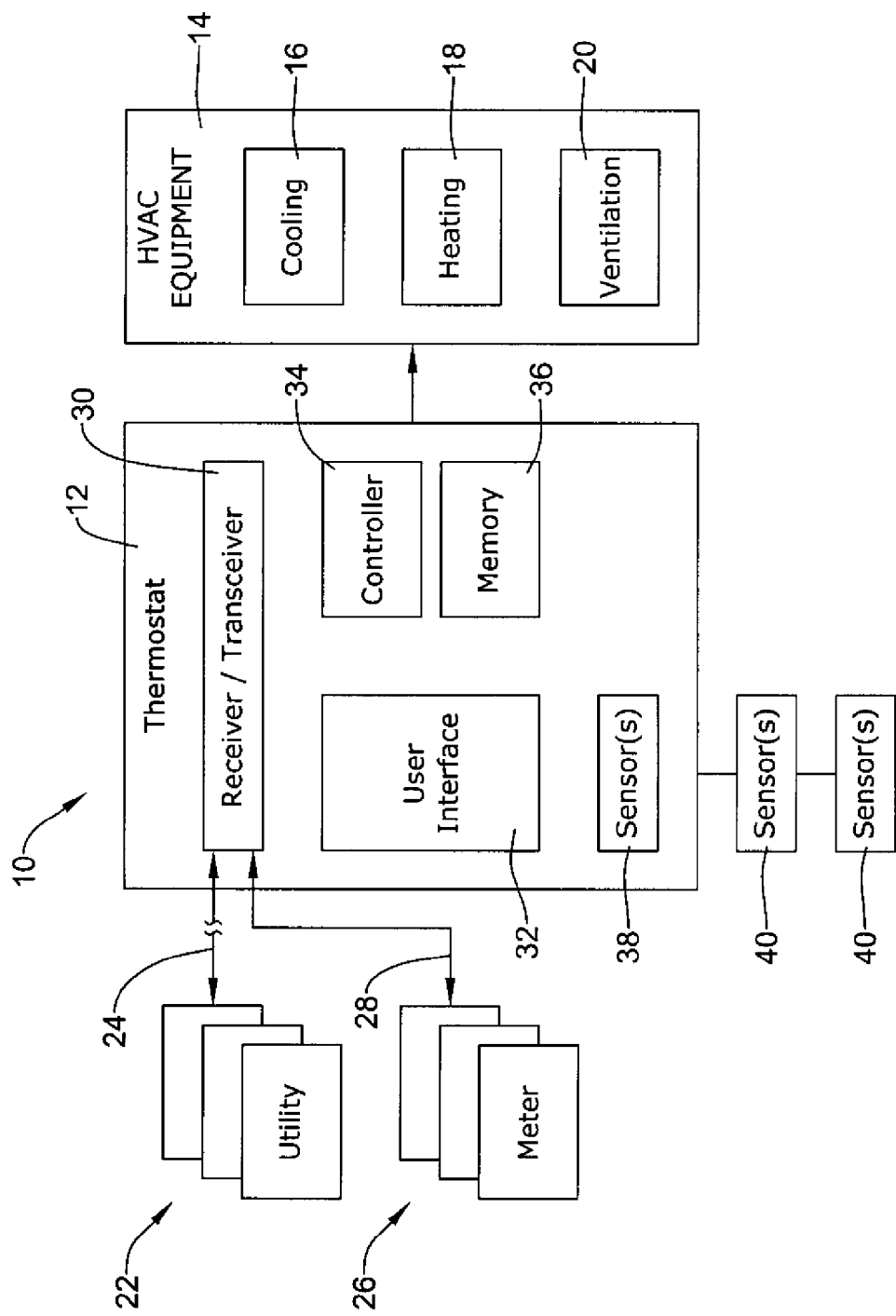
FIG. 1 shows an illustrative but non-limiting HVAC control system.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials may be illustrated for the various elements, those skilled in the art will recognize that many of the examples provided have suitable alternatives that may be utilized.

FIG. 1 shows an illustrative but non-limiting HVAC control system 10. The illustrative HVAC control system 10 includes a thermostat 12 that may be adapted to interact with and control HVAC equipment 14. HVAC equipment 14 may include one or more of cooling equipment 16, heating equipment 18 and/or ventilation equipment 20. In some cases, cooling equipment 16 and heating equipment 18 may, for example, be combined in a forced air system, or perhaps a heat pump system, particularly in residential and/or light commercial applications. In other cases, one or more of cooling equipment 16, heating equipment 18 and/or ventilation equipment 20 may be distinct systems controlled by thermostat 12. In some instances, it is contemplated that thermostat 12 may represent two or more distinct thermostats, each controlling different equipment within HVAC equipment 14, and or different zones within a structure.

In the illustrative embodiment, thermostat 12 may be adapted to interact and/or communicate with a utility 22. Utility 22 may represent a utility company or another entity that produces or otherwise provides an energy source such as electricity, natural gas and the like, or provides another utility such as water and/or sewer service. Utility 22 may represent a utility company or other entity that provides a source of hot water that can be used for heating and/or any other desired use. Utility 22 may provide hot water from a geothermal source, or by heating water using biomass or even microwave energy.

In some instances, thermostat 12 may receive signals from utility 22 via a communication network 24. Communication network 24 may include wireless communication between utility 22 and thermostat 12, using radio frequencies and the like. In some cases, communication network 24 may represent a hard-wired communication network between utility 22 and thermostat 12, such as copper wiring, coaxial cable, CAT 5 cable, fiber optics, and the like. In some instances, especially if utility 22 provides electrical power to the building in which thermostat 12 is located, communication network 24 may represent signals sent over the power lines themselves. In some cases, part of communication network 24 may be a wired and another part may be wireless. More generally, communication network 24 may be any suitable communication path between utility 22 or the like and thermostat 12.

In some instances, thermostat 12 may receive information from utility 22 pertaining to utility usage, utility usage history, current and/or historical rate information, and the like. Alternatively, or in addition, thermostat 12 may receive information from meter 26 pertaining to utility usage, utility usage history, current and/or historical rate information, and the like. In some cases, thermostat 12 may receive information from utility 22 and/or meter 26 pertaining to a current electrical rate, say in cents per kilowatt-hour. In some instances, thermostat 12 may receive information regarding a remaining balance on a prepaid account, or perhaps monthly garbage and/or sewer charges.

Utility 22 and/or meter 26 may, for example provide information to thermostat 12 regarding a measure of utility usage. In some cases, the measure of utility usage may be related to current utility costs over a designated period of time (e.g. over a past year, a past month, a past week, a past day, a past hour, etc.), i.e., a current electrical cost over a designated period of time, a current gas cost over a designated period of time, a current water cost of a designated period or time and the like. In some instances, a measure of utility usage may include a quantity of utility usage, and thus utility 22 may provide thermostat 12 with information pertaining to how much energy (e.g. in KWH, which are kilowatt-hours), for example is currently being used over a designated period of time (e.g. over a past year, a past month, a past week, a past day, a past hour, schedule period, etc.).

In some instances, utility 22 and/or meter 26 may provide messages relating to utility usage. For example, utility 22 may provide, via communication network 24, one or more messages intended for a homeowner, facilities manager or the like. In some cases, if utility demand is high, utility 22 may provide one or more messages that permit or instruct thermostat 12 to display suggestions on how to save energy, water or other resource. For example, if utility energy demand is high or expected to be high, thermostat 12 may display one or more messages suggesting that the homeowner or facilities manager conserve energy by changing a temperature set point, or perhaps suggesting that they wait and run energy intensive appliances later in the day, when utility demand may be lower. Utility 22 may, in some instances, provide one or more messages that permit or instruct thermostat 12 to display information pertaining to current or expected weather, current or expected energy demand, current or expected pricing tiers, etc.

In some cases, utility 22 and/or meter 26 may provide one or more messages that cause thermostat 12 to display information relating to utility billing. This may include utility billing history, current utility billing rates and/or current utility costs, and the like. Thermostat 12 may display information pertaining to a measure of utility usage during a first time period (e.g. a designated month such as the current month) and information pertaining to a measure of utility usage during a second time period (e.g. the designated month one year ago) that is different from the first time period. While not required, the first time period may occur temporally before the second time period. In some cases, controller 34 may compute a measure of utility usage that is consumed by the HVAC system of the building or other structure by monitoring the on-time of one or more HVAC system components 16, 18 and/or 20.

The first time period and the second time period may each, independently, be any desired length of time, and may be temporally separated by any desired time interval. In some cases, the first time period may immediately precede the second time period. The first time period may, if desired, be one or more months before the second time period. In some cases, the first time period may be about a year or more prior to the second time period.

In some cases, the first time period and the second time period may each correspond to a one week (168 hours) time period, and the first time period may correspond to an immediately preceding week relative to the second time period. In some instances, the first time period and the second time period may each correspond to a one month time period. The first time period may be a one month time period that immediately precedes the second time period. In some cases, the first time period (e.g. June 2006) may be a one month time period that is about one year prior to the second time period (e.g. June 2007).

In some cases, the indication of the measure of utility usage that is displayed for the first time period may include an indication of the cost of utility usage during the first time period, and the indication of the measure of utility usage that is displayed for the second time period includes an indication of the cost of utility usage during the second period of time. In some instances, the indication of the measure of utility usage that is displayed for the first time period includes an indication of the quantity of utility usage during the first period of time, and the indication of the measure of utility usage that is displayed for the second time period include an indication of the quantity of utility usage during the second period of time.

In some embodiments, thermostat 12 may be adapted to interact and/or communicate with a meter 26 over a communication line 28. Meter 26 may, for example, be adapted to measure and/or regulate a flow of energy or other resource (e.g. water) from utility 22, and may also provide thermostat 12 with usage information via a wireless, wired, optical, or any other suitable communication path. In some instances, although direct communication therebetween is not expressly shown in FIG. 1, meter 26 may provide utility 22 with usage information.

Communication line 28 may represent wireless communication between meter 26 and thermostat 12. In some cases, communication line 28 may represent a hard-wired line between meter 26 and thermostat 12, such as copper wiring, coaxial cable, CAT 5 cable, fiber optic cable, and the like. In some instances, although not expressly illustrated in FIG. 1, it is contemplated that meter 26 may also communicate with utility 22, and may receive utility rate information and the like from utility 22, but this is not required in all embodiments.

The preceding discussion describes communication that may occur between utility 22 and thermostat 12 and/or between meter 26 and thermostat 12. In order to accommodate this communication, thermostat 12 may include a receiver and/or transceiver 30 that permits thermostat 12 to communicate with utility 22 via communication network 24 and/or to communicate with meter 26 via communication line 28. As noted, one or both of communication network 24 and/or communication line 28 may be wired or wireless. In some cases, communication network 24 may, for example, include a wireless paging system, and receiver and/or transceiver 30 may be a load control receiver that uses, for example, a 900 MHz paging technology such as the FLEX® paging technology available from Motorola. One such load control receiver is available from Cannon Technologies, located in Wayzata, Minn., although it is contemplated that any suitable communication equipment may be used, as desired.

Thermostat 12 may include a user interface 32 that may be adapted to accept information from a user as well as to provide information to the user. In some cases, user interface 32 may include a liquid crystal display (LCD) as well as a keypad or similar entry device. In some instances, user interface 32 may include a touch screen LCD that provides both functions.

Thermostat 12 may include a controller 34 that is adapted to oversee the aforementioned communications between thermostat 12 and utility 22 and/or meter 26. Controller 34 may regulate information that is solicited and/or displayed on user interface 32. Controller 34 may be adapted to implement a control algorithm that is adapted to at least partially control one or more components of HVAC equipment 14. Thermostat 12 may include a memory block 36 that can be used to store operating parameters, utility usage history and the like.

Thermostat 12 may include a sensor 38, which may be located within thermostat 12 as well as one or more external sensors 40, as desired. Each of sensors 38 and 40 may be any type of sensor, or may represent multiple sensors, such as temperature sensors, humidity sensors and the like. External sensors 40 may be hard wired to thermostat 12, or may communicate wirelessly, as desired.

Figure 2:
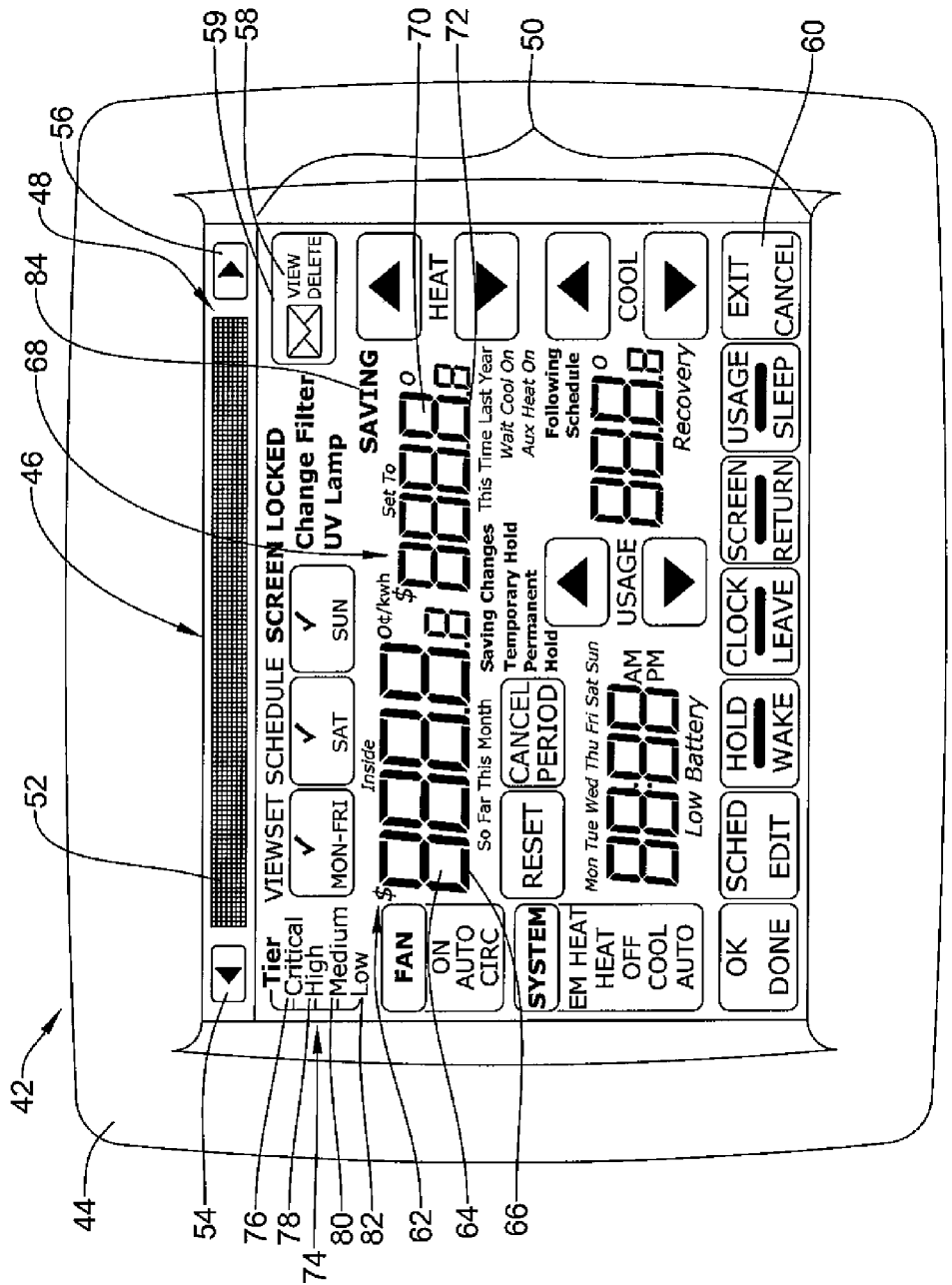
FIG. 2 shows an illustrative but non-limiting example of a thermostat of FIG. 1.

FIG. 2 shows an illustrative but non-limiting example of a thermostat 42 that may be considered as representing thermostat 12 (FIG. 1), but showing additional detail regarding user interface 32. Thermostat 42 includes a thermostat housing 44 and an LCD display 46 that is visible from outside thermostat housing 44. Thermostat housing 44 may be formed of any suitable material and having any suitable dimensions. In some cases, thermostat housing 44 is stamped or molded from a polymeric material. In some cases, LCD display 46 is a touch screen LCD, but this is not required in all embodiments.

LCD display 46 may be considered as including a first region 48 and a second region 50. In the illustrative embodiment, first region 48 includes an array of pixels 52 that are arranged into a plurality of rows and a plurality of columns to form an array of pixels that is suitable for displaying alphanumeric characters such as text in a dot matrix format. In some cases, one or more of pixels 52 may be square or round fixed segment pixels. For example, first region 48 may include an array of pixels 52 that are arranged into 7 rows and a total of 125 columns. To more clearly illustrate the individual pixels, pixels 52 are schematically illustrated in FIG. 2 as unlit.

First region 48 may be constructed using either fixed segment type LCD display or a graphic type LCD display. When first region 48 is constructed as a fixed segment LCD display, a number of relatively small fixed segments dots are provided, and in some cases, may be arranged into character blocks, with each character block having, for example, 5×7 dots. In some cases, each character block can be addressed separately and can form numbers, letters and a limited number of symbols. In other cases, each fixed segment dot can be addressed separately. When first region 48 is constructed as a graphics type LCD display, a relatively larger number of pixels are arranged in rows and columns, and each pixel can typically be individually addressed.

In an illustrative but non-limiting example, first region 48 may include or be formed as fixed segment LCD display, and may include a total of 25 5×7 characters, for a total of 875 individual pixels 52. Each pixel 52 may be square and may be 0.5 millimeters by 0.5 millimeters in size. There may be a small gap between adjacent pixels 52. In some cases, there may be a 0.05 millimeter gap between adjacent pixels 52. These pixels 52 may be formed as part of the fixed segment mask used in fabricating the fixed segment LCD display.

In some cases, first region 48 may be used to display messages and other similar text. Controller 34 may be coupled to user interface 32 and may be adapted to display a message including two or more text characters in first region 48 using the array of fixed segment pixels 52. If desired, controller 34 may be adapted to scroll messages across at least part of first region 48. This may be useful in displaying messages that are too long to simultaneously fit in their entirety within first region 48. Scrolling may also be useful in attracting attention to messages being displayed within first region 48. In some cases, a message may be flashed, i.e., repeatedly turned on and off, within first region 48 to draw attention to the particular message.

In some cases, display 46 may include a left arrow icon 54 and/or a right arrow icon 56, which may be used to scroll through a long message, or perhaps to scroll through multiple messages. Left arrow icon 54 and right arrow icon 56 may be constructed as fixed segment icons, and may not be considered part of first region 48, even though they are located within an upper portion of display 46. In some embodiments, pressing right arrow icon 56 may cause controller 34 (FIG. 1) to display another message, if another message is available, or to cause a message to scroll. Pressing left arrow icon 54 may cause controller 34 to display a previous message or to cause a message to scroll.

Second region 50 of user display 46 may include a plurality of fixed segment graphical icons. At least some of the fixed segment graphical icons within second region 50 may be or may include a word, a perimeter boundary and/or a word within a perimeter boundary. In some instances, LCD display 46 is a touch screen LCD, and one or more of the fixed segment graphical icons may coincide with one or more touch sensitive buttons.

For example, second region 50 may include a message icon 58. If thermostat 42 has received or otherwise generated a text message to be displayed within first region 48, controller 34 (FIG. 1) may flash message icon 58 and/or may illuminate the "VIEW" text within message icon 58. The "VIEW" text may be formed as part of a fixed segment graphical icon, if desired. Message icon 58 may coincide with a touch sensitive button or portion of LCD display 46. In some cases, message icon 58 may include a fixed segment perimeter boundary 59.

Pressing message icon 58 may cause controller 34 to proceed with displaying and/or scrolling one or more messages within first region 48 of display 46 using the array of fixed segment pixels 52. In some cases, once the message has been displayed, the "DELETE" text within message icon 58 may be illuminated, although this is not required. Pressing message icon 58 at this stage may cause controller 34 to delete the message that has been displayed or is currently being displayed. Second region 50 may include an "EXIT" icon 60. Pressing EXIT icon 60 instead of message icon 58 may cause controller 34 to return to a previous screen without deleting the displayed message or messages. Example messages are shown and discussed with respect to subsequent Figures.

Fixed segment LCD displays are often configured to display Arabic numbers (0-9) using seven segments. In contrast, fourteen segments are often needed to display other characters such as the Roman alphabet, measurement units and other symbols. In some instances, second region 50 of display 46 may include a set 62 of fixed segments that are configured to display numbers. In particular cases, set 62 may be configured to display utility usage data including utility usage quantity data and/or utility usage cost data. In some cases, set 62 may include a total of five fixed segment numbers 64, with each fixed segment number 64 having a total of seven distinct bar segments 66.

Similarly, second region 50 of display 46 may include a set 68 of fixed segments that are configured to display numbers. In some cases, set 68 may be configured to display historical utility usage data including historical utility usage quantity and/or historical utility usage cost data. In some cases, set 68 may include a total of five fixed segment numbers 70, with each fixed segment number 70 having a total of seven distinct bar segments 72.

In some instances, second region 50 of display 46 may include a TIER icon 74 that may include one or more of a CRITICAL fixed segment 76, a HIGH fixed segment 78, a MEDIUM fixed segment 80 and/or a LOW fixed segment 82. In some cases, utility 22 (FIG. 1) may provide a signal to thermostat 42 informing thermostat 42 that current energy costs and/or current energy demand has reached a particular tier or level. For example, if energy demand and/or energy cost is low, the LOW fixed segment 82 may be illuminated. The other fixed segments may be illuminated in accordance with the energy demand and/or energy cost data provided by utility 22. In some situations, TIER icon 74 may not be illuminated.

If the current energy demand and/or current energy costs reach a critical level, controller 34 (FIG. 1) may illuminate CRITICAL fixed segment 76. In some cases, when the current energy demand and/or current energy costs reaches a certain level (e.g. high or critical), a SAVING icon 84 may be illuminated or even flash indicating that controller 34 has altered a temperature set point in accordance with the energy demand information provided by utility 22 (FIG. 1). In some cases, SAVING icon 84 may be illuminated irrespective of the current tier level.

In some instances, utility 22 may, in response to energy demand and/or energy cost data, may determine how temperature set points are to be altered. A customer may, for example, sign a contract permitting utility 22 to alter temperature set points and/or to determine temperature differentials as necessary and/or appropriate. If utility 22 determines that a particular tier level has been reached, utility 22 may send a signal to thermostat 42 temporarily altering a temperature set point, either by providing a temporary temperature set point or by providing a temperature differential that can be applied to the temperature set point specified by the current schedule under which thermostat 42 is otherwise operating. The contract may permit utility 22 to send a signal to thermostat 42 instructing thermostat 42 to shut down HVAC equipment 14 (FIG. 1) for a length of time that may be predetermined and/or may be calculated based, for example, on current energy demand and/or current energy rates.

In some instances, for example, utility 22 may provide a signal to thermostat 42 instructing thermostat 42 to change to a temporary temperature set point. The temporary set point may vary, depending on the current energy tier. For example, utility 22 may suggest or require, based at least in part on the contract signed by the owner, a heating temperature set point of 70° F. for a low energy cost, 65° F. for a medium energy cost, 60° F. for a high energy cost, and 50° F. for a critical energy cost. Utility 22 may suggest or require, based at least in part on the contract, a cooling temperature set point of 72° F. for a low energy cost, 77° F. for a medium energy cost, 82° F. for a high energy cost, 86° F. for a critical energy cost. These temperatures are merely illustrative and are not intended to limit or define in any way or manner. In some cases, utility 22 may provide thermostat 42 with the heating and cooling temperature set point values corresponding to each tier level.

Controller 34 (FIG. 1) may issue a control signal to HVAC equipment 14 for operating cooling equipment 16 and/or heating equipment 18 when the temperature is different than the temperature set point associated with the acceptable energy cost level. In the above example, when the current energy price is high, the control signal may issue control information for operating heating equipment 18 when the temperature fell to 60° F. or below. For cooling equipment 16, the control signal would issue control information for operating cooling equipment 16 when the temperature rose to or above 82° F. Additionally, the receiver and/or transceiver 30 may receive information from the utility(s) for an energy (and/or water) bill for usage of energy (and/or water) during a time period. In some cases, the user may authorize payment of the energy (and/or water) bill and have the authorization transmitted to utility 22 via the thermostat 12.

In some instances, utility 22 may send a signal instructing thermostat 42 to temporarily change its temperature set point by a particular temperature differential that depends on tier level. For example, utility 22 may provide a signal including a temperature differential or offset of 0° F. for a low energy cost, a temperature differential or offset of 2° F. for a medium energy cost, a temperature differential or offset of 6° F. for a high energy cost and a temperature differential or offset of 10° F. for a high energy costs.

If, for example, the current temperature set point for heating is set at 68° F. and the energy demand reaches the critical level, thermostat 42 may temporarily operate with a temperature set point of 58° F. (68° F.−10 F). If, for example, the current temperature set point for cooling is set at 76° F. and the energy demand reaches the high level, thermostat 42 may temporarily operate with a temperature set point of 86° F. (76° F.+10° F.).

Depending on the specifics of the contract between the owner and utility 22, in some cases the owner may be able to override the temporary temperature set points provided by the utility. In some cases, the owner may not be permitted to make any changes, and in fact thermostat 42 may be instructed to not accept set point changes while utility 22 is providing a temporary temperature set point and/or a temperature differential to thermostat 42.

In some cases, it is contemplated that a homeowner, a facilities manager and/or an installer may program thermostat 42 with information pertaining to how temperature set points are to be altered in response to various energy demand and/or energy cost levels provided by utility 22. In some cases, setback information that has been programmed into thermostat 42 may be based at least in part upon which time period (WAKE, LEAVE, RETURN, SLEEP) thermostat 42 is currently operating under.

Figure 3:
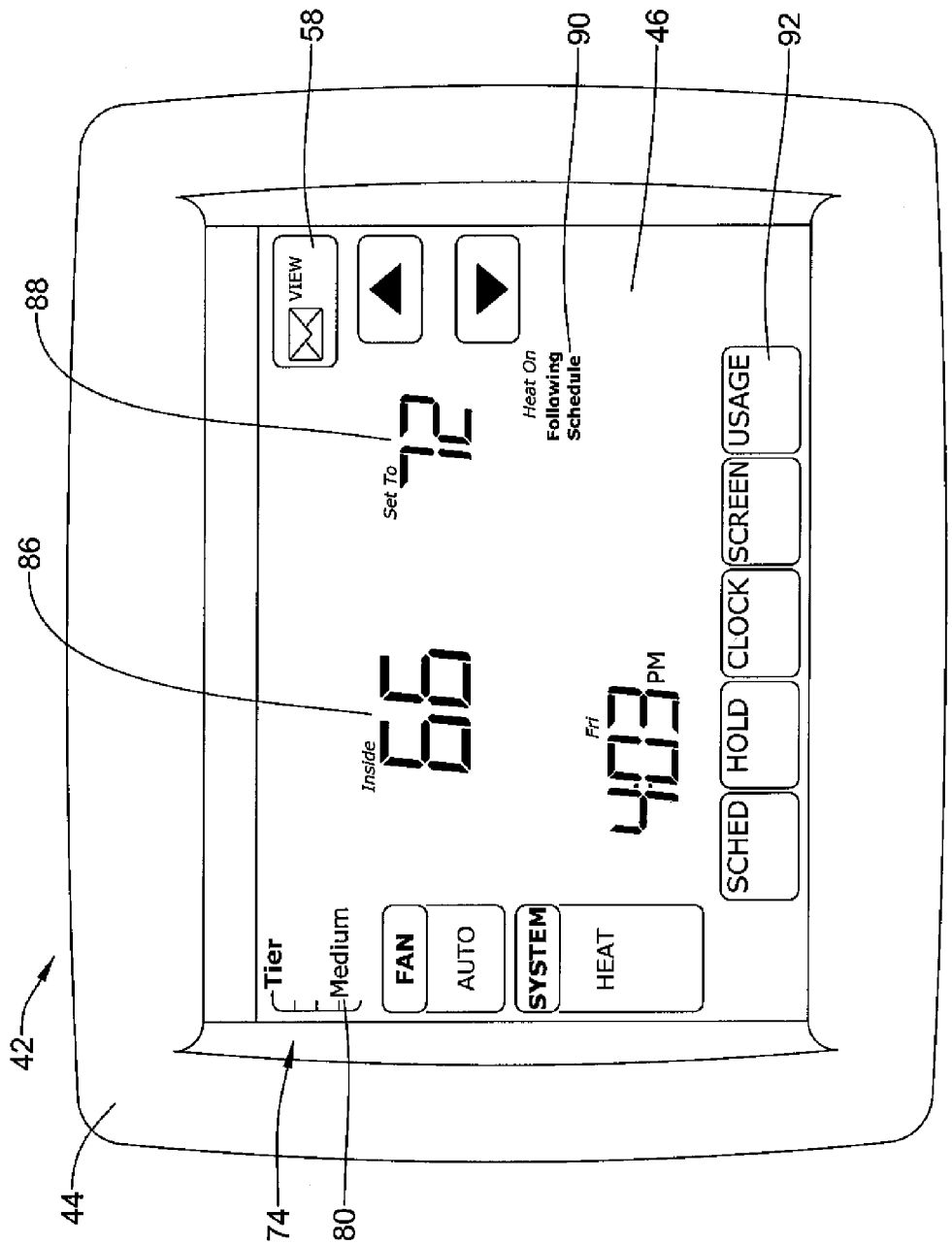
FIG. 3 shows an illustrative thermostat operating in accordance with its programming.

FIG. 3 shows the illustrative thermostat 42 operating in accordance with its programming. On second region 50 of display 46, controller 34 (FIG. 1) is displaying a current inside temperature value 86 and a current temperature set point 88. If message icon 58 is blinking or otherwise illuminated, pressing message icon 58 may cause one or more messages to be displayed, as will be illustrated subsequently.

As TIER icon 74 is indicating that the current energy demand and/or current energy cost is at a medium level, the illustrative thermostat 42 may continue to operate in accordance with its schedule, as indicated by the "Following Schedule" fixed segment icon 90. It can be seen that as the temperature set point 88 is higher than the current temperature value 86, the heat is currently operational.

Figure 4:
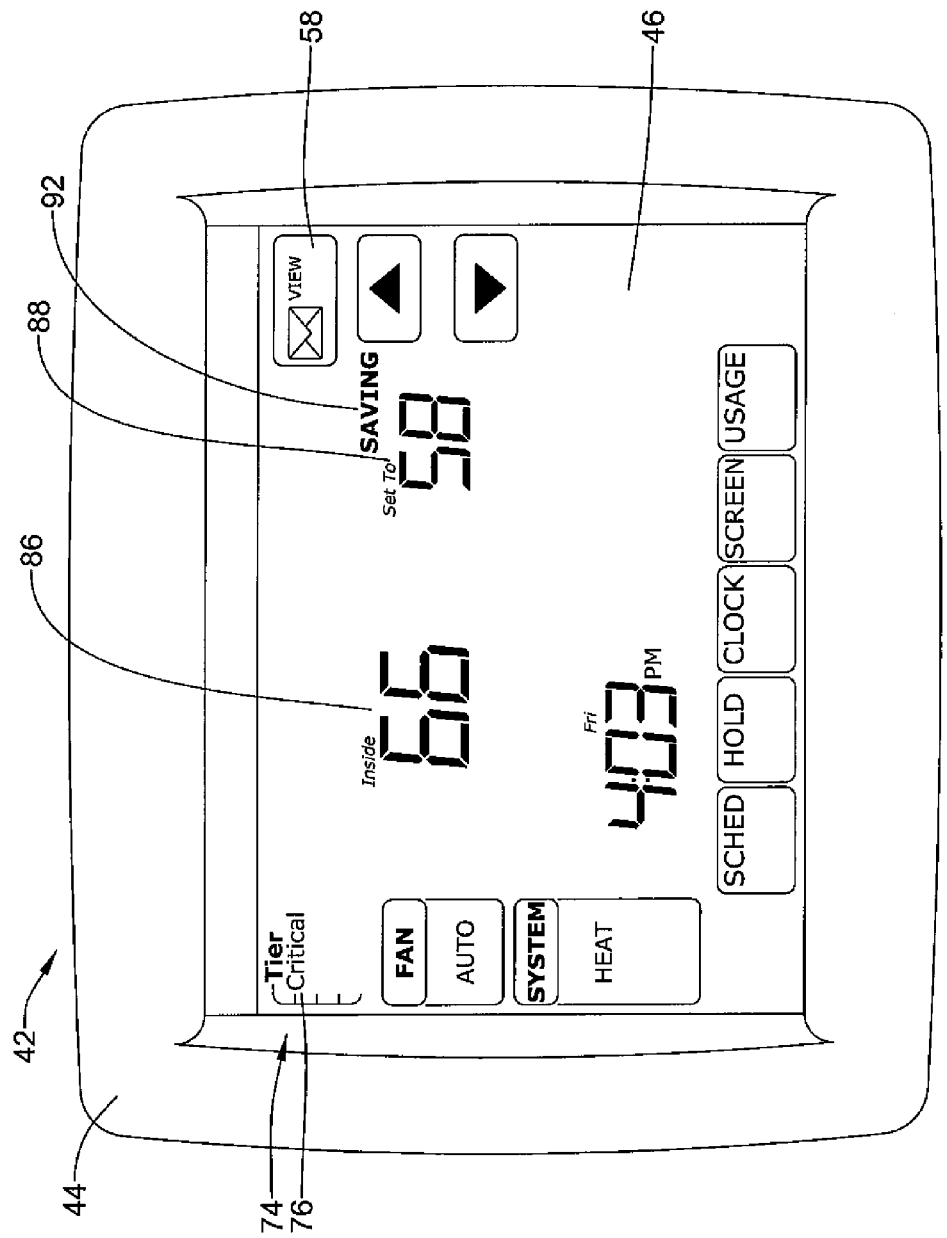
FIG. 4 shows the illustrative thermostat of FIG. 3 after the current energy demand and/or current energy cost has reached a critical level.

In FIG. 4, TIER icon 74 is indicating that the current energy demand and/or current energy cost has reached a critical level 76. While current inside temperature value 86 remains constant at 66° F., it can be seen that the temperature set point 88 has dropped from the 72° F. value shown in FIG. 3 to a savings temperature value of 58° F., and the heat has thus shut off. In some cases, controller 34 monitors the communication with utility 22. In some cases, if the communication is broken or otherwise not functioning properly for some reason, thermostat 42 may return to its normal schedule until such time as communication is reestablished.

Figure 5:
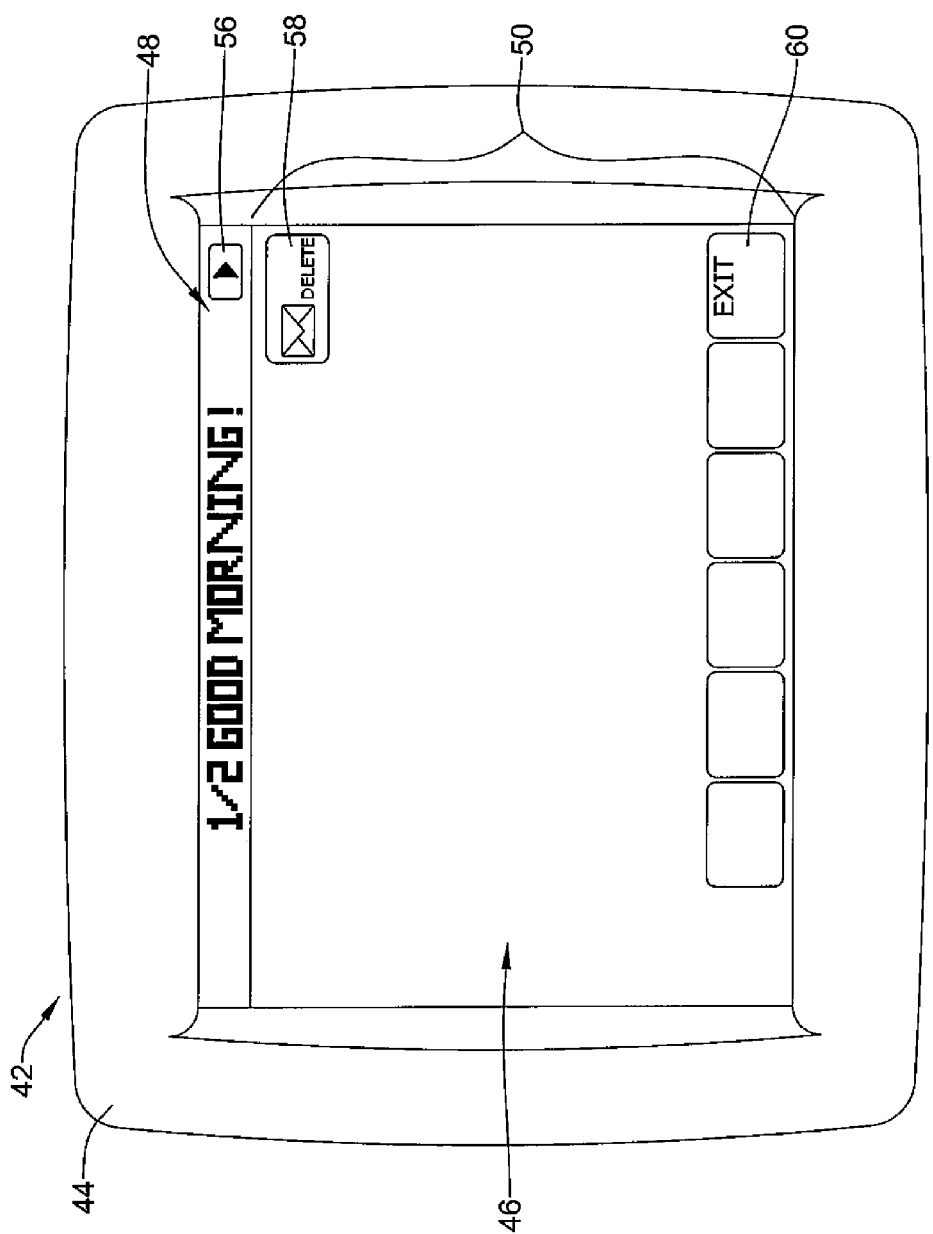
FIG. 5 shows the illustrative thermostat of FIG. 3 displaying a first stored or received message.
Figure 6:
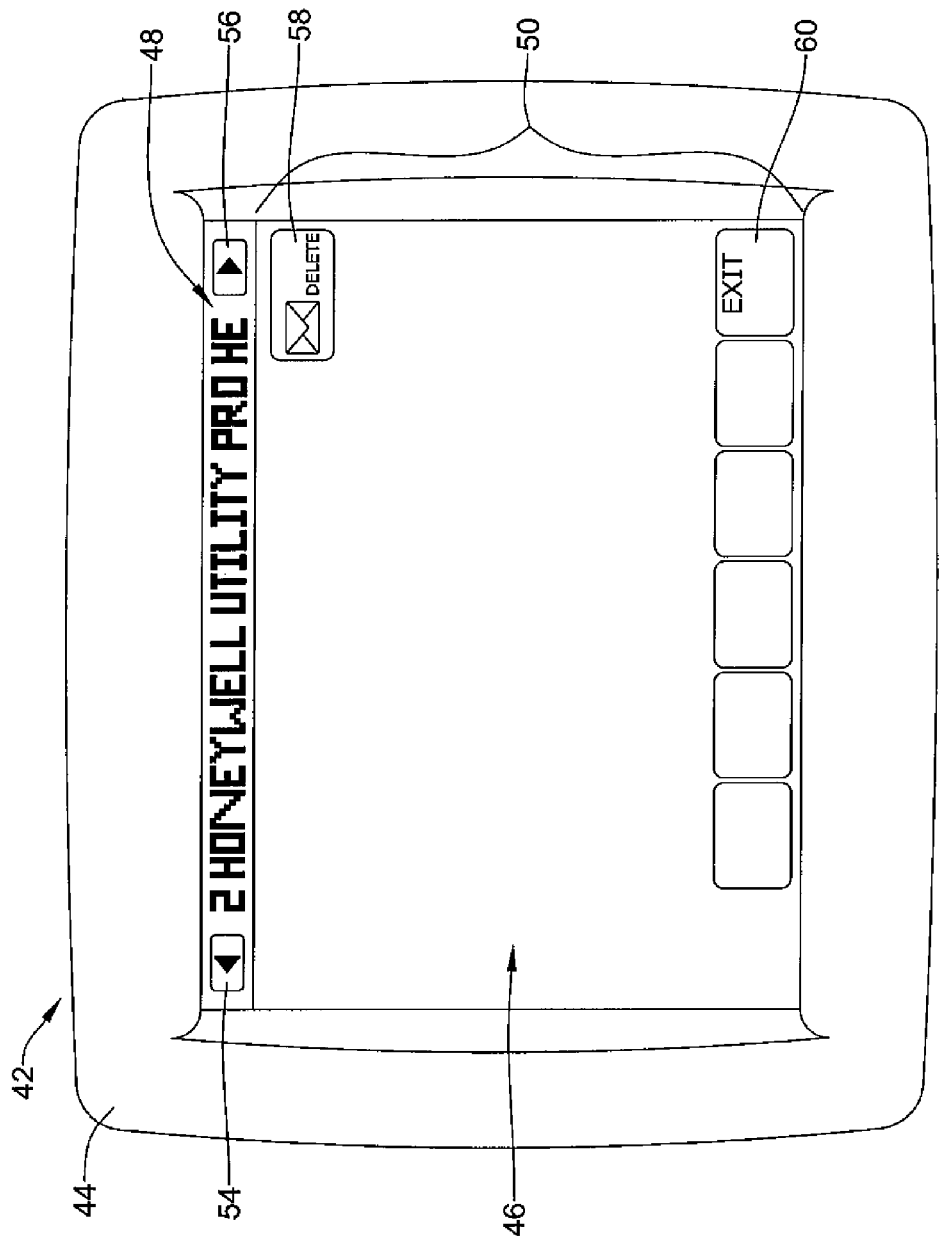
FIGS. 6-7 shows the illustrative thermostat of FIG. 5 displaying a second stored or received message.
Figure 7:
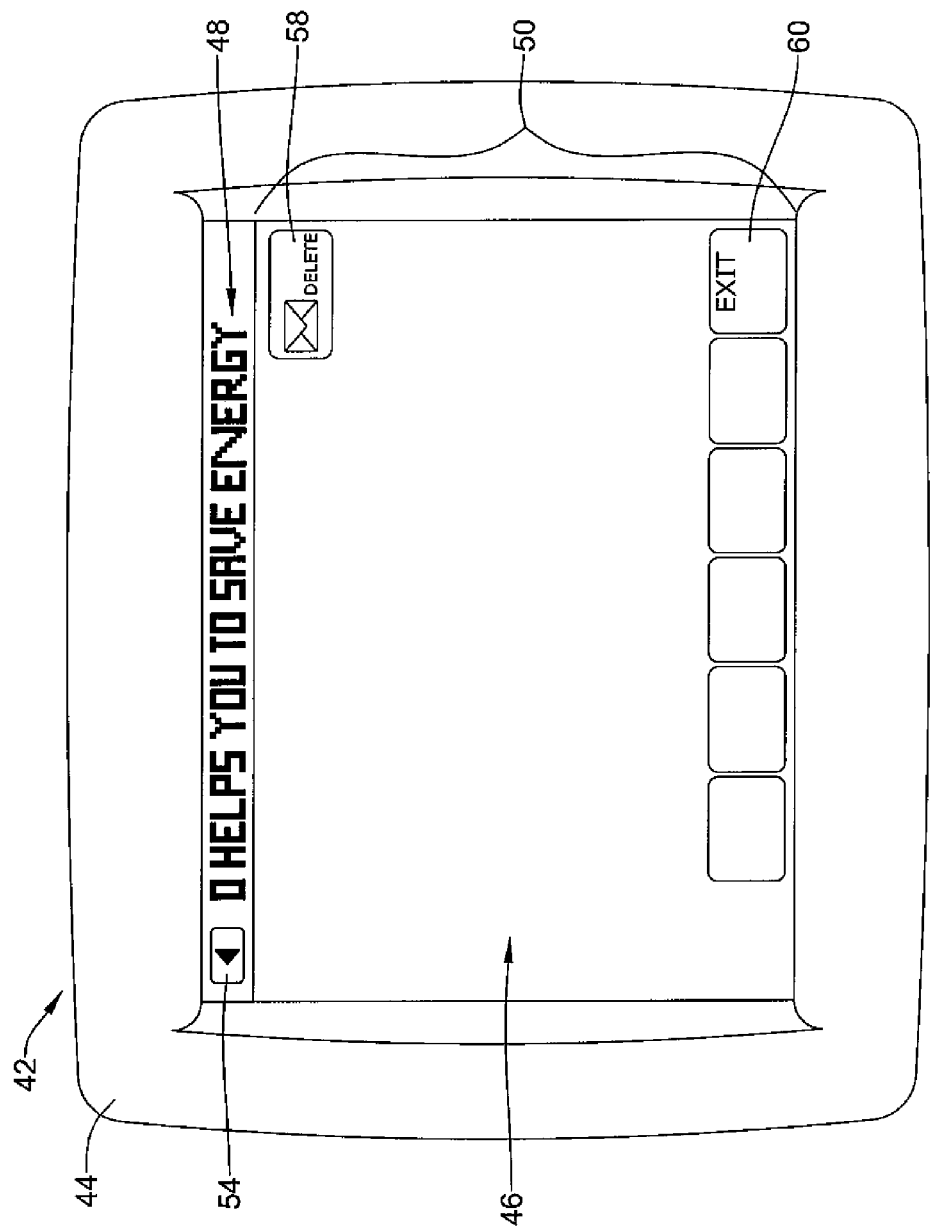

Returning to FIG. 3, assume for illustrative purposes that message icon 58 is blinking or is otherwise illuminated. In the illustrative embodiment, pressing message icon 58 will cause controller 34 (FIG. 1) to display stored or received messages, as shown in FIG. 5. First region 48 of display 46 can be seen as displaying a message "Good Morning!". Because there is more than one message to display (two, in this example), the message includes "½" in front of the message, and right arrow icon 56 is illuminated. Pressing right arrow icon 56 may cause controller 34 to display the second message, as shown in FIGS. 6 and 7. It can be seen that once the message has been viewed, message icon 58 changes from illuminating the VIEW fixed segment icon to illuminating the DELETE fixed segment icon.

In this particular example, the second message is "2 Honeywell UtilityPRO Helps You to Save Energy", which is too large to display within the 25 character blocks forming first region 48. Thus, controller 34 (FIG. 1) may scroll the message. This can be seen by comparing FIGS. 6 and 7. In FIG. 6, first region 48 includes "2 Honeywell UtilityPRO He", which is the first 25 characters of the message while in FIG. 7, first region 48 includes "0 Helps You to Save Energy", which represents the last 25 characters of the message. These are screen captures illustrating how text fits within first region 48. While the message is broken over two Figures, it will be understood that the message actually scrolls smoothly across first region 48 of display 46. In some cases, it is contemplated that text may be scrolled vertically, rather than horizontally.

Because a second or subsequent message is being displayed, it can be seen that left arrow icon 54 is illuminated, so that a user may move back to the previous message. In some cases, if only one message is available or otherwise appropriate for display, neither left arrow icon 54 nor right arrow icon 56 may be illuminated.

Figure 8:
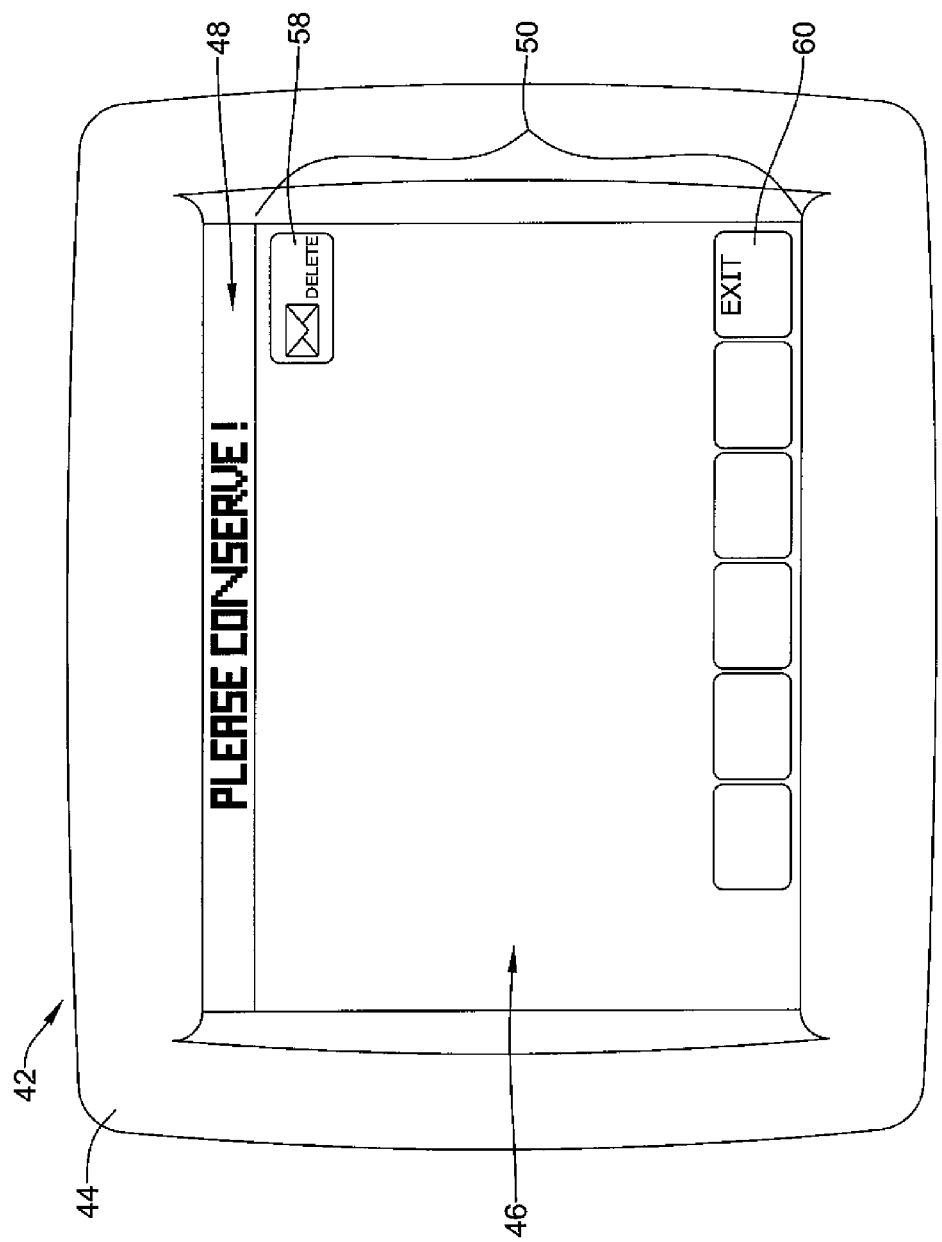
FIG. 8 shows the illustrative thermostat of FIG. 3 displaying a "Please Conserve" message received from a utility.
Figure 9:
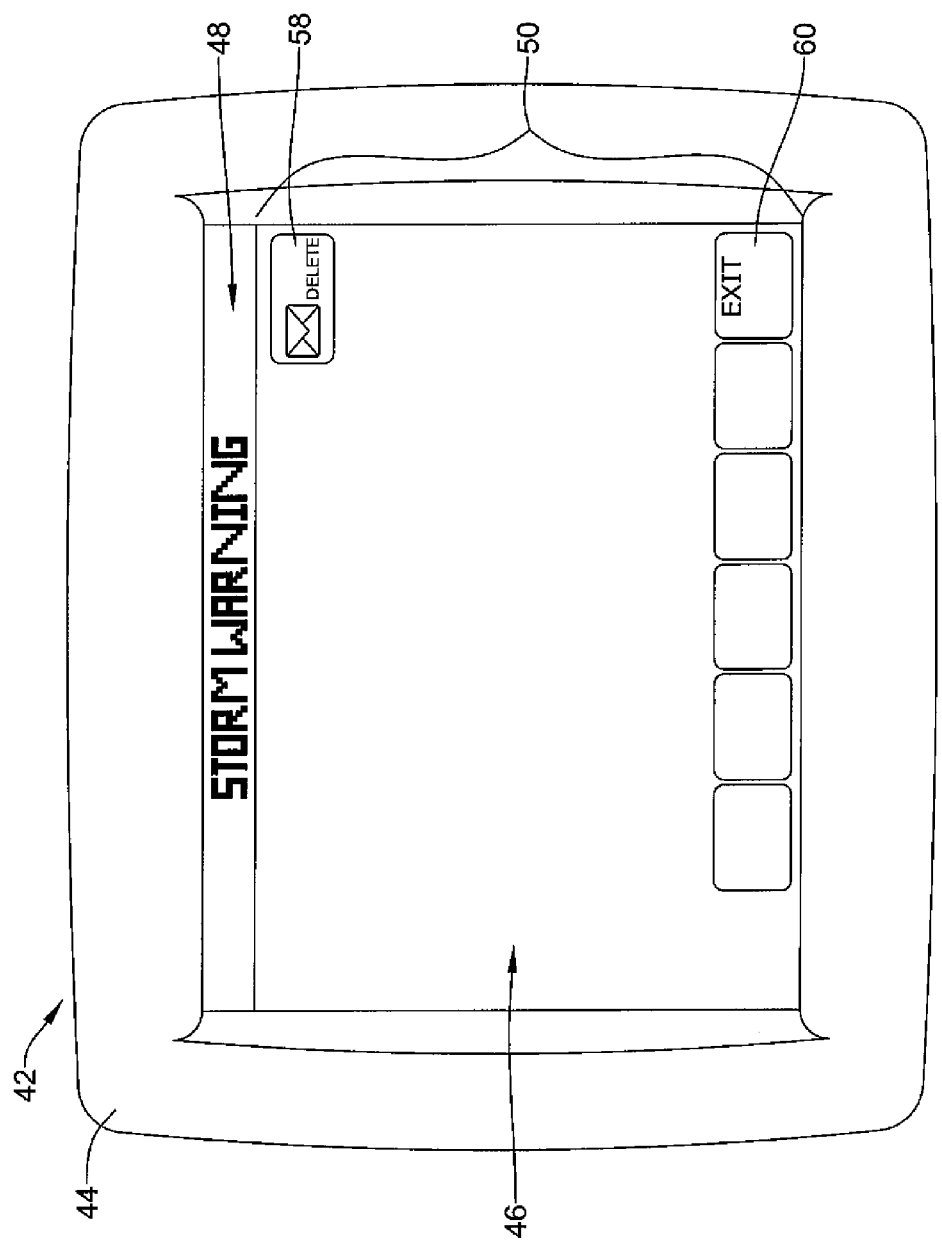
FIG. 9 shows the illustrative thermostat of FIG. 3 displaying a "Storm Warning" message received from a utility or other source.

A wide variety of messages may be displayed. For example, as shown in FIG. 8, first region 48 of display 46 may, in response to a signal from utility 22 (FIG. 1), display a message reading "Please Conserve!" This message may be displayed when, for example, the utility demand is high or expected to be high. Similar messages may suggest that the person refrain from running energy intensive appliances such as washing machines until the energy demand drops. Another illustrative message is seen in FIG. 9, in which first region 48 of display 46 displays a message reading "Storm Warning", perhaps in response to utility 22 forwarding a signal from the local weather authorities, or perhaps the local weather authorities are equipped to broadcast a warning signal directly to receiver and/or transceiver 30 (FIG. 1). It is contemplated that at least some of the messages may be targeted toward certain customers. For example, a tornado warning message may only be sent to those thermostats that are within the geographic region that is currently under a tornado warning. In another example, an ozone or UV warning message may only be sent to those thermostats that are within the geographic region that is currently experiencing high ozone or UV. Likewise, if the demand for energy is particularly high or expected to be high for only some of a utility's customers or part of the utility's grid, a message may be directed to only those thermostats that correspond to those customers (e.g. a unique message to a particular group of customers).

It is also contemplated that promotional messages may be sent to certain thermostats. For example, messages that inform users of certain promotional or other events or services, such as sales at local stores, may be provided. Tips on saving energy and/or the maintenance of equipment may also be provided. In some cases, a water utility may have certain restrictions on water usage, such as limiting the watering of lawns to ever other day. In some cases, the water utility may send a message to the thermostat to notify the user of the water restrictions. In some cases, the water utility may send a message indicating that watering of lawns is prohibited for the customer on a particularly day (e.g. today) or during some other time period.

In some cases, thermostat 42 may be adapted to provide a user with information regarding current and/or historical energy consumption data and corresponding energy costs. For example, FIGS. 10-15 illustrative this feature. Returning briefly to FIG. 3, in which thermostat 42 is operating in accordance with its schedule, it can be seen that lower region 50 of display 46 includes a USAGE icon 92. In the illustrative embodiment, pressing USAGE icon 92 brings the user to the screen shown in FIG. 10.

Figure 10:
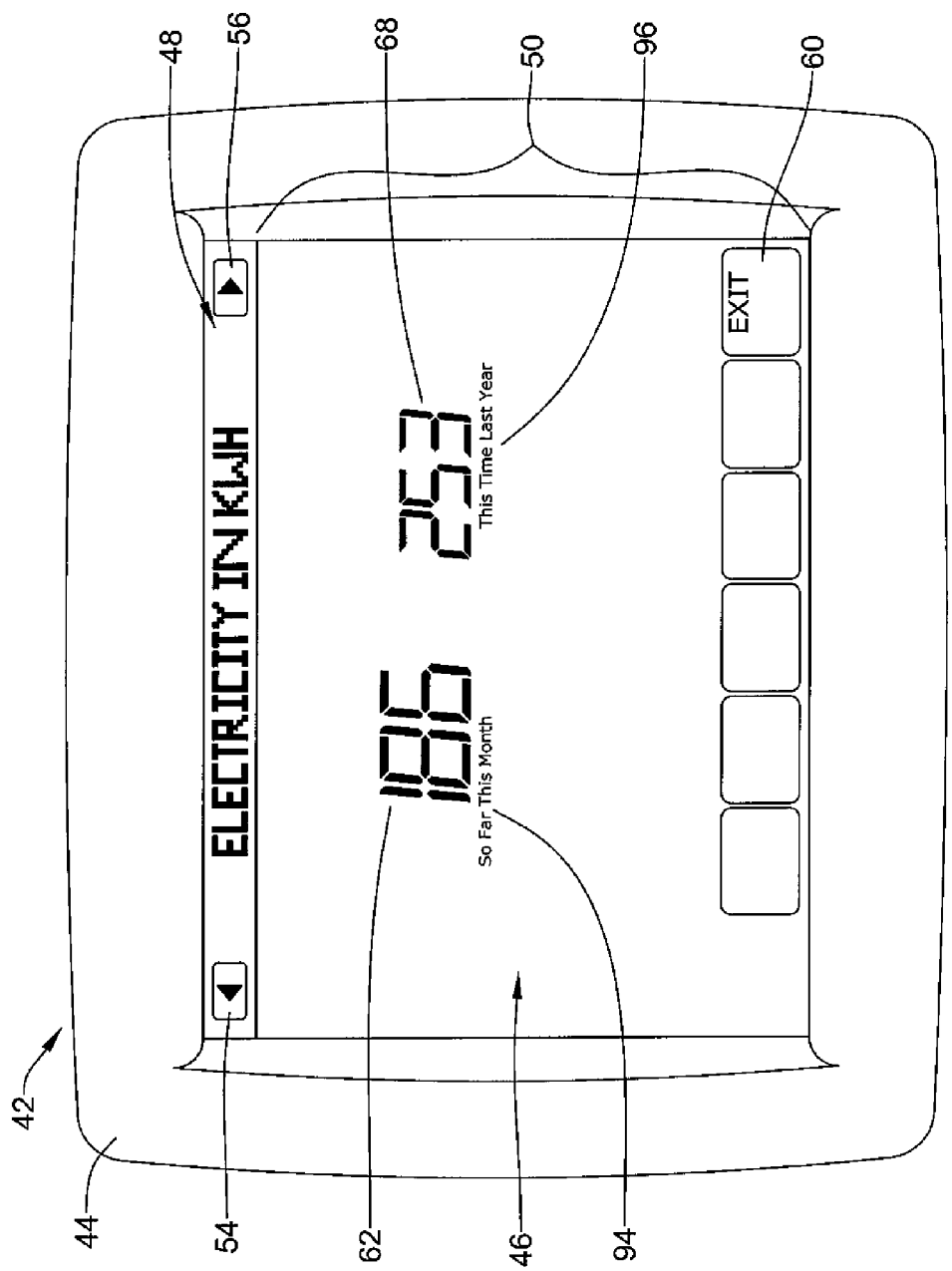
FIG. 10 show the illustrative thermostat of FIG. 3 displaying information related to electrical consumption including historical electrical consumption information.

In FIG. 10, controller 34 (FIG. 1) is displaying information pertaining to electrical consumption. In particular, controller 34 is instructing first region 48 of display 46 to display "ELECTRICITY IN KWH", so that the user can put into context the numerical data displayed within second region 50 of display 46 using set 62 of fixed segments and set 68 of fixed segments. Set 62 is displaying a value for the amount of electricity used thus far this month while set 68 is being used to display a value for the corresponding time period last year. Fixed segment icon 94 informs the user of the current time period while fixed segment icon 96 informs the user of the corresponding historical time period. As discussed above, other time periods may also be chosen or otherwise selected or displayed, as desired.

Figure 11:
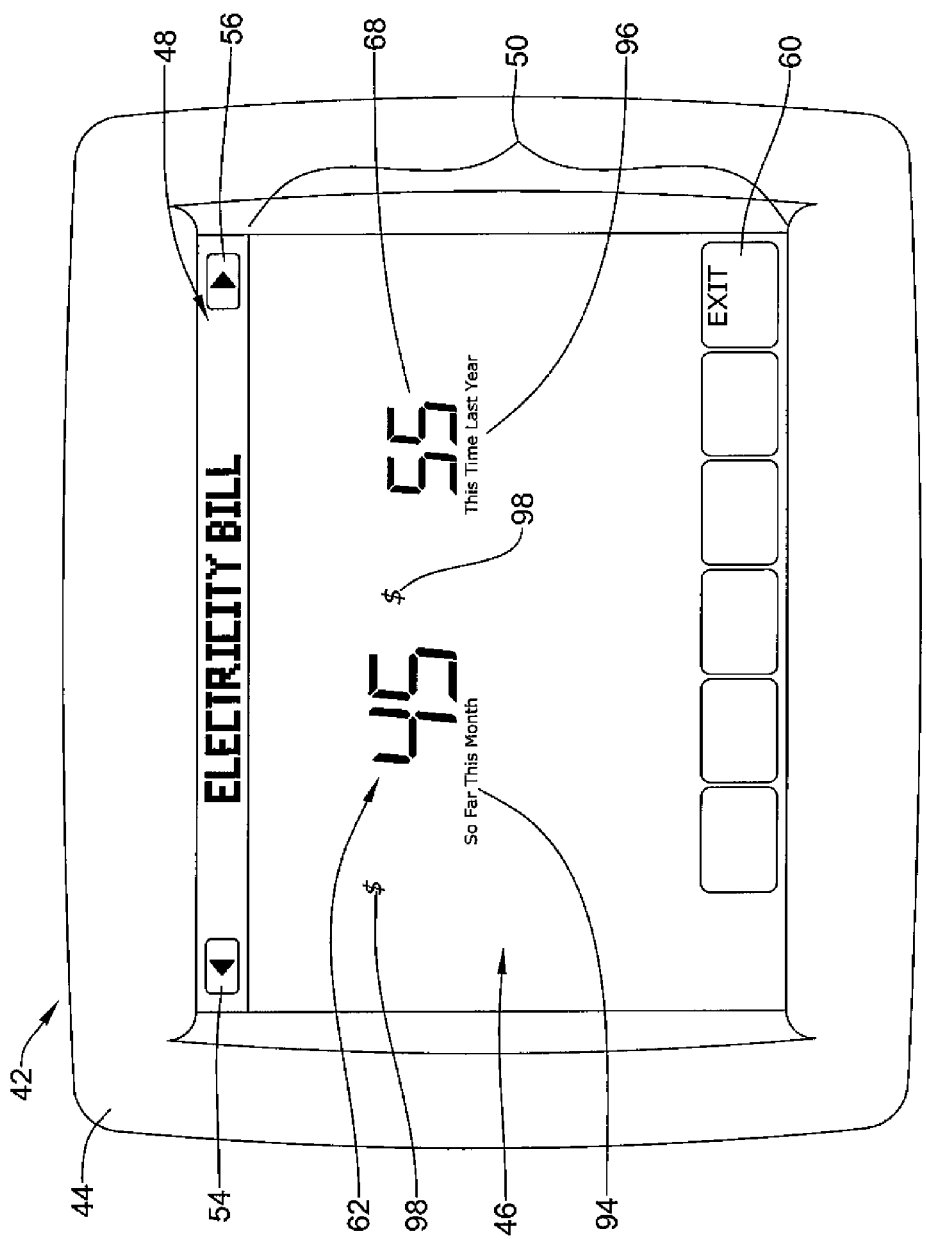
FIG. 11 show the illustrative thermostat of FIG. 3 displaying information related to electrical costs including historical electrical cost information.

Pressing right arrow icon 56 brings the user to FIG. 11, in which controller 34 (FIG. 1) is displaying information regarding electrical costs, while instead pressing EXIT button 60 would return the user to FIG. 3. In FIG. 11, first region 48 of display 46 now reads "ELECTRICITY BILL". Fixed segment icon 98, representing a dollar sign, provides additional context for the information being displayed. In some cases, fixed segment icon 98 may be omitted, if desired.

Set 62 is being used by controller 34 to display the electrical bill to date for the month while set 68 is being used by controller 34 to provide the corresponding historical data. Pressing left arrow icon 54 would return the user to the screen shown in FIG. 10 while pressing right arrow icon 56 will bring the user to the screen shown in FIG. 12. Pressing EXIT button 60 would return the user to FIG. 3.

Figure 12:
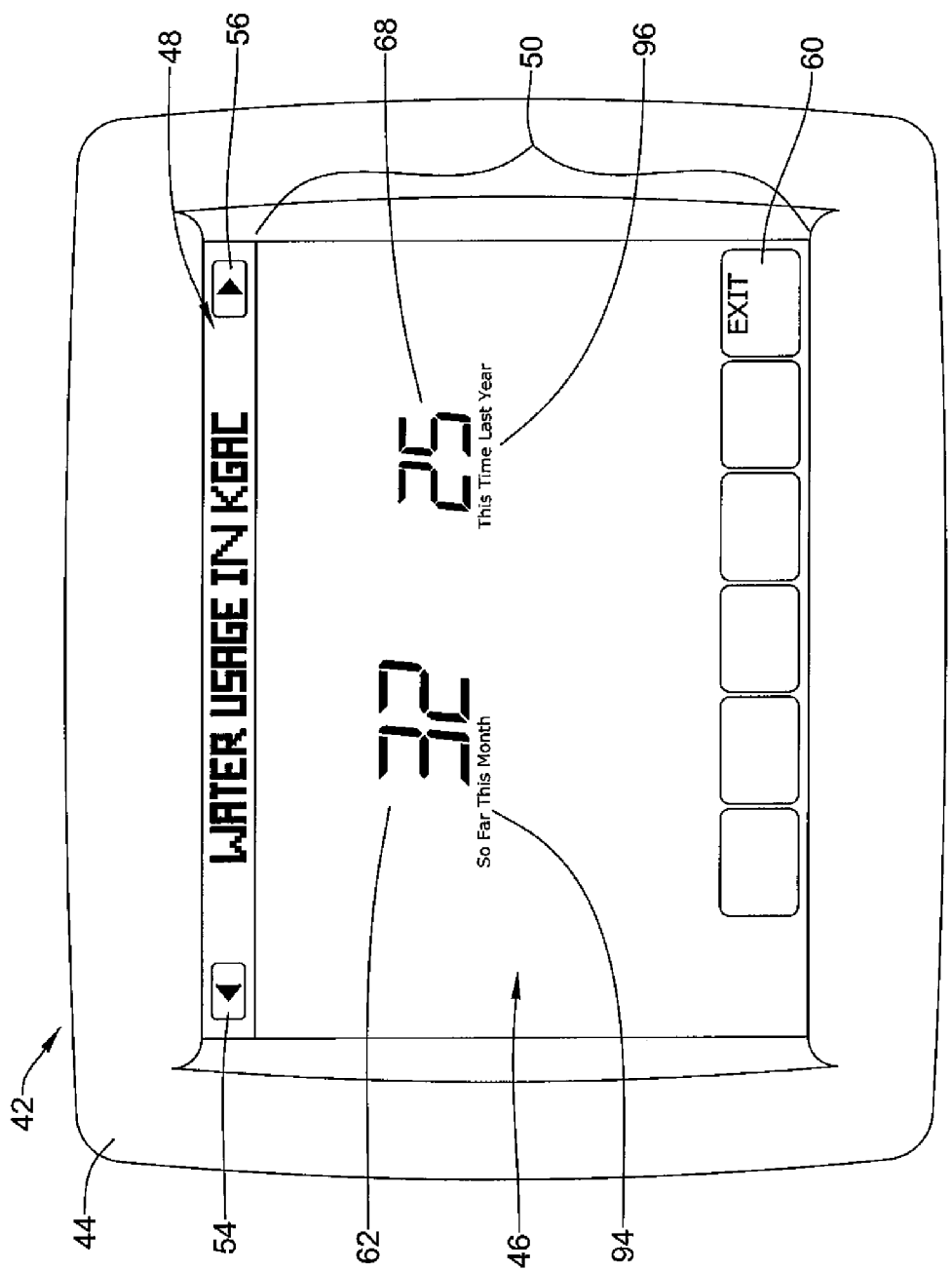
FIG. 12 show the illustrative thermostat of FIG. 3 displaying information related to water usage including historical water usage information.

In FIG. 12, controller 34 (FIG. 1) is displaying information pertaining to water consumption. In particular, controller 34 is instructing first region 48 of display 46 to display "WATER USAGE IN KGAL", so that the user can put into context the numerical data displayed within second region 50 of display 46 using set 62 of fixed segments and set 68 of fixed segments. Set 62 is displaying a value for the amount of water used thus far this month while set 68 is being used to display a value for the corresponding time period last year. Fixed segment icon 94 informs the user of the current time period while fixed segment icon 96 informs the user of the corresponding historical time period. As discussed above, other time periods may also be chosen or otherwise selected or displayed.

Figure 13:
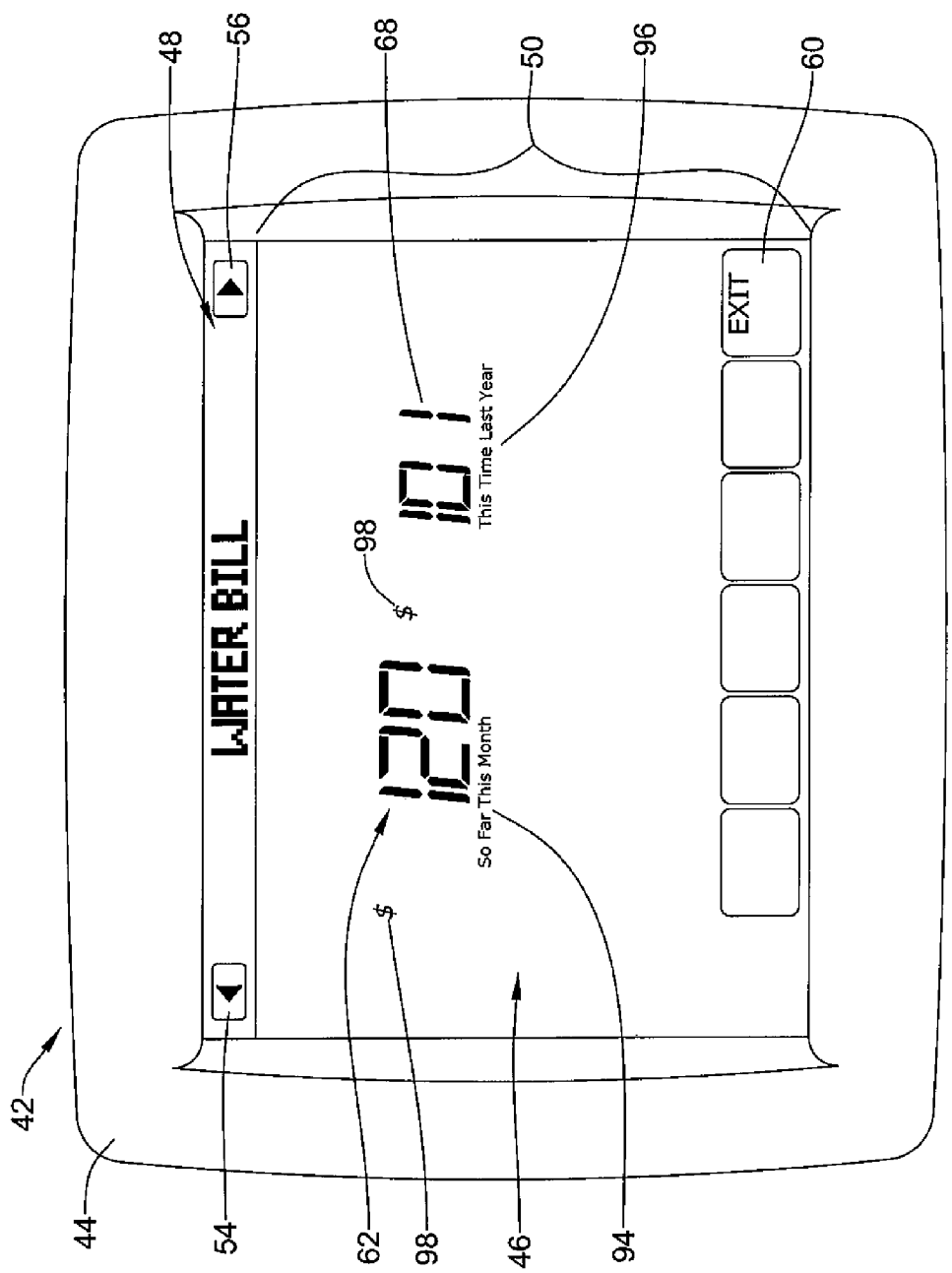
FIG. 13 show the illustrative thermostat of FIG. 3 displaying information related to water usage costs including historical water usage cost information.

Pressing right arrow icon 56 brings the user to FIG. 13, in which controller 34 (FIG. 1) is displaying information regarding water costs, while instead pressing EXIT button 60 would return the user to FIG. 3. In FIG. 13, first region 48 of display 46 now reads "WATER BILL". Fixed segment icon 98, representing a dollar sign, provides additional context for the information being displayed. In some cases, fixed segment icon 98 may be omitted, if desired.

Set 62 is being used by controller 34 to display the water bill to date for the month while set 68 is being used by controller 34 to provide the corresponding historical data. Pressing left arrow icon 54 would return the user to the screen shown in FIG. 12 while pressing right arrow icon 56 will bring the user to the screen shown in FIG. 14. Pressing EXIT button 60 would return the user to FIG. 3.

Figure 14:
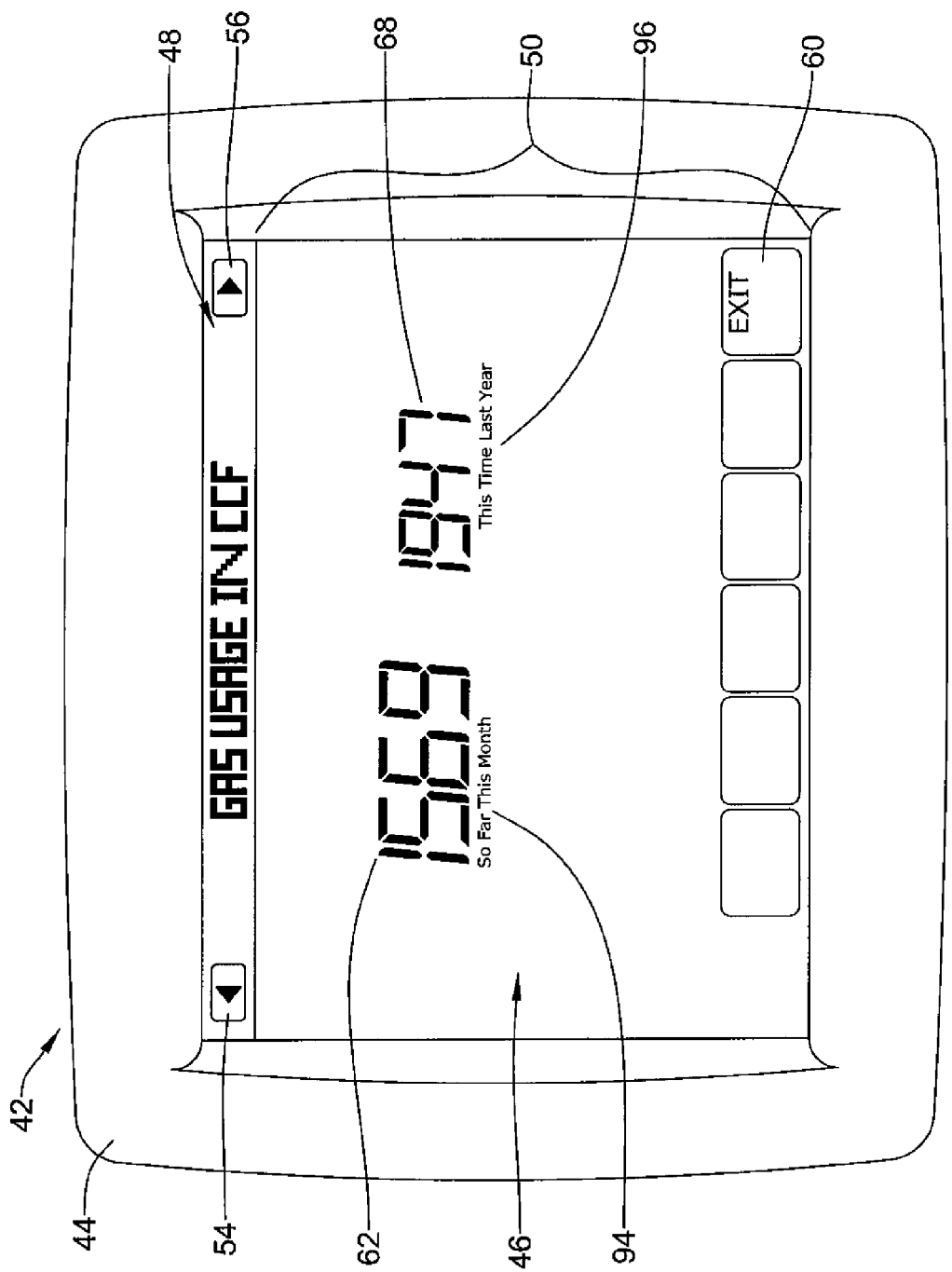
FIG. 14 show the illustrative thermostat of FIG. 3 displaying information related to gas usage including historical gas usage information.

In FIG. 14, controller 34 (FIG. 1) is displaying information pertaining to gas consumption. In particular, controller 34 is instructing first region 48 of display 46 to display "GAS USAGE IN CCF", so that the user can put into context the numerical data displayed within second region 50 of display 46 using set 62 of fixed segments and set 68 of fixed segments. Set 62 is displaying a value for the amount of gas used thus far this month while set 68 is being used to display a value for the corresponding time period last year. Fixed segment icon 94 informs the user of the current time period while fixed segment icon 96 informs the user of the corresponding historical time period. As discussed above, other time periods may also be chosen or otherwise selected or displayed.

Figure 15:
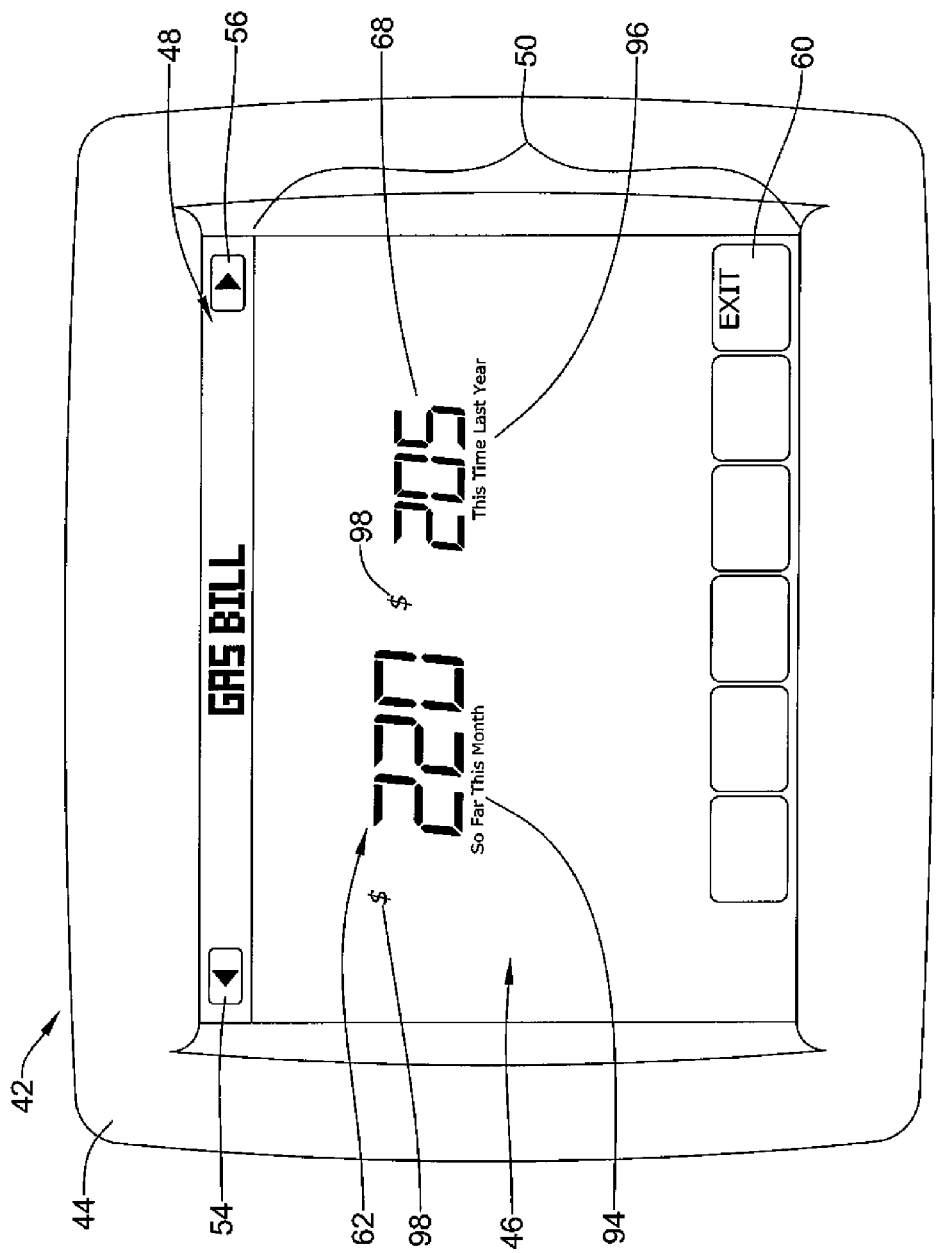
FIG. 15 show the illustrative thermostat of FIG. 3 displaying information related to gas usage costs including historical gas usage cost information.

Pressing right arrow icon 56 brings the user to FIG. 15, in which controller 34 (FIG. 1) is displaying information regarding gas costs, while instead pressing EXIT button 60 would return the user to FIG. 3. In FIG. 15, first region 48 of display 46 now reads "GAS BILL". Fixed segment icon 98, representing a dollar sign, provides additional context for the information being displayed. In some cases, fixed segment icon 98 may be omitted, if desired.

Set 62 is being used by controller 34 to display the water bill to date for the month while set 68 is being used by controller 34 to provide the corresponding historical data. Pressing left arrow icon 54 would return the user to the screen shown in FIG. 14 while pressing right arrow icon 56 will return the user to the screen shown in FIG. 10, unless thermostat 42 is equipped to display additional consumption or cost data. Pressing EXIT button 60 would return the user to FIG. 3.

Figure 16:
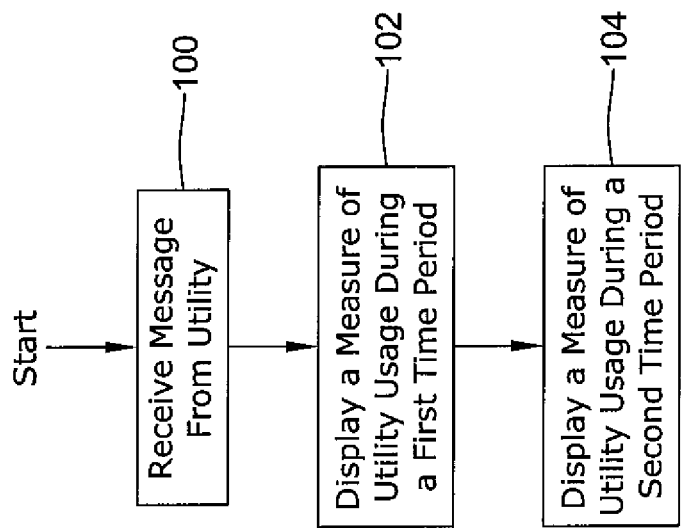
FIG. 16 is a flow diagram of an illustrative method in accordance with the present invention.
Figure 17:
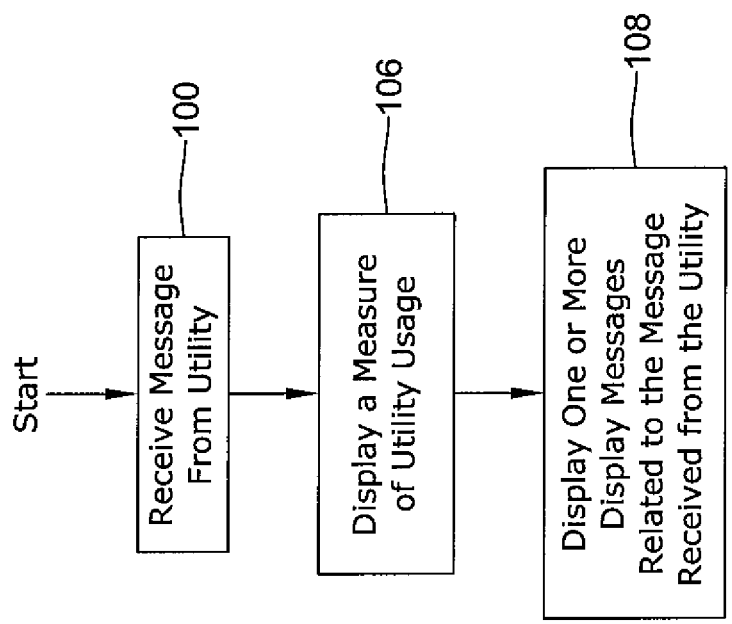
FIG. 17 is a flow diagram of another illustrative method in accordance with the present invention.

FIGS. 16 and 17 are flow diagrams illustrating methods that may be carried out using thermostat 42 (FIG. 2). In FIG. 16, control begins at block 100, where thermostat 42 receives a message from utility 22 (FIG. 1). The message received from utility 22 may be related to energy demand, current and/or past energy costs, energy conservation, weather alerts, promotional and/or advertisements and the like. At block 102, controller 34 (FIG. 1) displays on display 46 an indication of a measure of utility usage during a first time period. At block 104, controller 34 displays on display 46 an indication of a measure of utility usage during a second time period. In some cases, the first time period may predate the second time period, but this is not required.

In FIG. 17, control begins at block 100, where thermostat 42 (FIG. 2) receives a message from utility 22 (FIG. 1). At block 106, controller 34 (FIG. 1) displays on display 46 an indication of a measure of utility usage during a period of time. Control passes to block 108, where controller 34 displays on display 46 one or more display messages that are related to the message received from utility 22. These messages may pertain to energy demand, current energy costs, energy conservation, weather alerts, advertisements and the like.

In some cases, the indication of the measure of utility usage during the period of time may be displayed on display 46 at the same time or nearly the same time as the one or more messages are displayed on display 46. In some cases, they are not displayed simultaneously.

The present invention should not be considered limited to the particular examples described above, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

We claim:

1. A method for operating a thermostat that controls at least in part an HVAC system of a building or other structure, the method comprising:
   controlling the HVAC system to achieve a desired set point;
   receiving a message, either directly or indirectly, from a utility, another service provider, or a meter, wherein the message includes information related to utility consumption;
   storing the received message in a memory of the thermostat;
   displaying on a display of the thermostat a display indicator that is related to the received message, wherein the display indicator simultaneously provides a numerical summary of utility consumption during a first time period and a numerical summary of utility consumption during a second time period, wherein the second time period is after the first time period; and
   wherein the numerical summary of utility consumption during the first time period includes the cost of utility usage during the first time period, and the numerical summary of utility consumption during the second time period includes the cost of utility usage during the second time period.

2. A method for operating a thermostat that controls at least in part an HVAC system of a building or other structure, wherein the building or other structure receives energy from a utility, the method comprising:
   controlling the HVAC system to achieve a desired set point;
   receiving a message directed to a group of customers either directly or indirectly from the utility or another service provider, wherein the message includes a suggestion as to how to take action to mitigate a current demand on the utility;
   storing the received message in a memory of the thermostat; and
   displaying on a display of the thermostat a display indicator that is related to the received message.

3. The method of claim 2, wherein the display indicator suggests that the user change a temperature set point of the thermostat to save energy.

4. The method of claim 2, wherein the display indicator suggests that the user refrain from running an energy intensive appliance until later.

5. A method for operating a thermostat that controls at least in part an HVAC system of a building or other structure, the method comprising:
   controlling the HVAC system to achieve a desired set point;
   displaying on a touch screen display of the thermostat a home screen that displays a current temperature and a current time;
   receiving a message either directly or indirectly from a utility, another service provider, or a meter, wherein the message includes a measure related to utility usage;
   storing the received messages in a memory of the thermostat;
   receiving input from a user via the touch screen display to enter a utility usage mode;
   in response to entering the utility usage mode, displaying on the touch screen display of the thermostat a display indicator that is related to the received message;
   wherein the display indicator provides an indication of a measure of utility usage during a first time period, and an indication of a measure of utility usage during a second time period, wherein the second time period is after the first time period; and
   wherein the indication of the measure of utility usage that is displayed for the first time period includes an indication of the cost of utility usage during the first time period, and the indication of the measure of utility usage that is displayed for the second time period includes an indication of the cost of utility usage during the second time period.

* * * * *